Dec. 31, 1963 E. M. PELL 3,116,183
ASYMMETRICALLY CONDUCTIVE DEVICE
Filed May 15, 1958
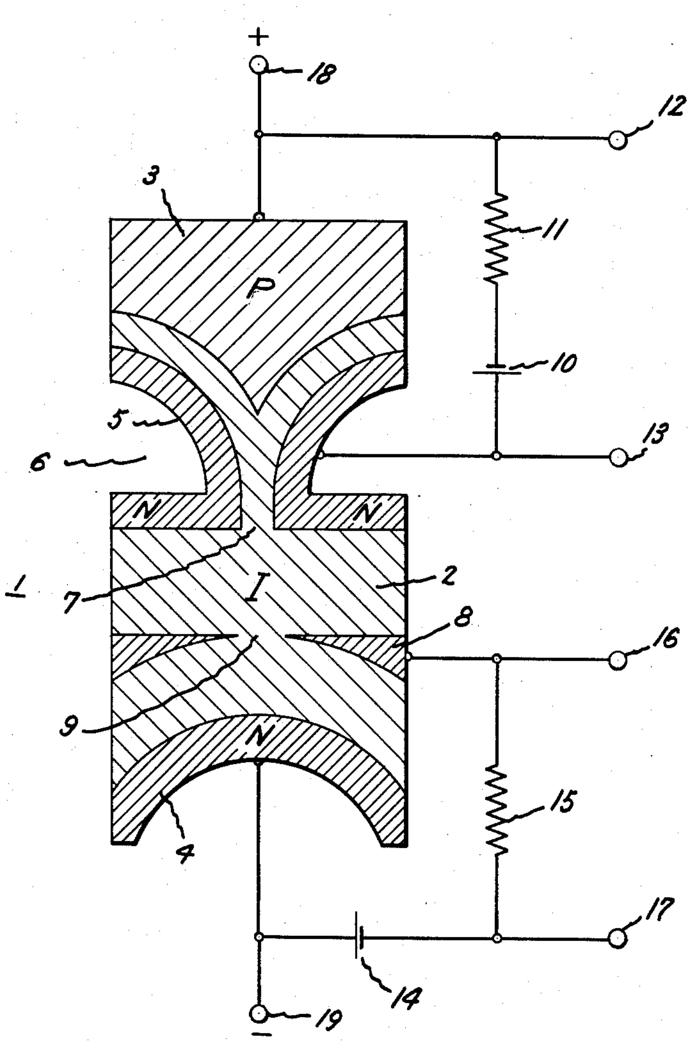
Inventor:
Erik M. Pell,
by John F. Ahern
His Attorney.

United States Patent Office 3,116,183
Patented Dec. 31, 1963

3,116,183

ASYMMETRICALLY CONDUCTIVE DEVICE

Erik M. Pell, Scotia, N.Y., assignor to General Electric Company, a corporation of New York Filed May 15, 1958, Ser. No. 735,406
4 Claims. (Cl. 148—33.5)

The present invention relates to semiconductor asymmetrically conductive devices, and more particularly, to thyratron-like solid-state semiconductor devices. Vacuum tubes have for many years been the most commonly used devices for the generation, amplification, and translation of electrical signals. With the development of the transistor and like devices, it has been possible to generate, amplify, and translate electric signals in the solid state rather than in an evacuated envelope. There still exists, however, a great need in the art for a semiconductor device capable of performing the same function performed by the thyratron gaseous discharge tube.

The thyratron is a gas filled triode electric discharge device characterized by a unique control characteristic. In thyratron devices, conduction of electrical current between cathode and anode is initiated at a voltage which is controlled by an electric potential applied to a third or control electrode. Once a substantial electric conduction occurs between anode and cathode, the control electrode substantially loses control and the cathode-anode current is generally limited only by the external circuit resistance. In general, the anode-cathode current in a thyratron device is interrupted only manually, by opening the circuit, or upon the lowering of the anode-cathode potential to a value insufficient to sustain the discharge within the device. Because of its unique characteristics, the thyratron gaseous discharge device is highly useful in switching, in control circuits, and for the rectification of alternating voltages.

Accordingly, one object of the present invention is to provide an improved solid-state switching control and rectifying device.

A further object of the invention is to provide a solid-state analog to the thyratron gaseous electric discharge device.

Briefly stated, in accord with one feature of the present invention, a semi-conductor thyratron-like device is provided in the form of a monocrystalline body of semiconductor material having two spaced regions of extrinsic conductivity type separated by a region of intrinsic conductivity type. A donor type gate or control electrode and an acceptor type gate or control electrode are formed along the body of intrinsic conductivity material between the two regions of extrinsic conductivity.

The novel features believed characteristic of the present invention are set forth in the appended claims. The invention itself, together with further objects and advantages thereof may best be understood with respect to the drawing in which the sole FIGURE represents, schematically, an asymmetrically conductive device constructed in accord with the present invention, and associated operating circuit therefor.

In the drawing, cylindrical semiconductor body 1 includes a central intrinsic conductivity type region 2, having at one end thereof a region of P-type conductivity 3 and at the other end thereof, a region of N-type conductivity 4, both of which exhibit extrinsic conductivity characteristics. An N-type or donor-type gate 5 is formed by a donor activator dominated region of the semiconductor in the form of a quarter-circular cross-sectioned annulus adjacent to an annular quarter-circular groove 6 which is cut around the periphery of the cylindrical surface of body 1. At the interior of donor gate 5, the intrinsic region constitutes only a thin constricted filamentary region 7, thus allowing potentials applied to donor gate 5 to establish a field therein which may control, initially, the flow of conduction carriers therethrough. An acceptor gate 8 in the form of a thin annular wedge-shaped acceptor dominated region of the semiconductor is also present within intrinsic region 2 along the path between N-type region 4 and P-type region 3. As may be noted from the drawing, the interior of the wedge-shaped annulus comprising acceptor gate 8 also presents a constricted region 9 allowing a voltage impressed upon P-type gate 8 to establish an electric field therein to control the flow of electric conduction carriers between regions 3 and 4.

Semiconductor body 1 may conveniently be composed of any covalent semiconducting crystal, preferably those having a diamond crystal lattice structure, in which electric conduction is electronic, namely, due to passage of either electrons or of positive holes, as opposed to the ionic type conduction contained in certain liquid solutions and the like. Such semiconductor materials include germanium, silicon, silicon carbide, boron, and the intermetallic compounds composed of stoichiometric solid solutions of elements of group III of the periodic table on the one hand, and elements of group V of the periodic table on the other hand, such as, for example, aluminum phosphide, gallium arsenide, and indium antimonide. Suitable semiconductors also include stoichiometric intermetallic compounds between metals of group II and group VI of the periodic table as, for example, cadmium telluride and zinc telluride.

The N-type semiconductor region comprising N-type gate 5 may be formed by using an originally N-type region or by the diffusion or alloying of a significant but small quantity of the order of a few parts per million of a donor activator impurity for the semiconductor into that region of a P-type semiconductor body. For semiconductors such as germanium, silicon, and silicon carbide, these donors include lithium and the elements of group V of the periodic table such as phosphorus, arsenic, antimony, and bismuth. For the intermetallic compounds of groups III and V of the periodic table, the donor activator impurities are found in group VI of the periodic table and include sulfur, selenium, and tellurium. For the semiconductors composed of intermetallic compounds of groups II and VI of the periodic table, the donor materials are found in groups III and VII of the periodic table and include aluminum, gallium, indium, chlorine, bromine, and iodine.

The P-type conductivity characteristics of acceptor gate 8 may be caused by the use of an originally P-type body or by the addition, to that region of an N-type semiconductor body, of a significant amount, the order of parts per million, of an acceptor activator for the particular semiconductor as, for example, by diffusion or alloying. For the semiconductors including germanium, silicon, and silicon carbide, acceptor activator elements are found in group III of the periodic table and include boron, aluminum, gallium, and indium. For the intermetallic compounds of groups III and V of the periodic table, the acceptor elements are found in group II of the periodic table and include magnesium, zinc, and cadmium. For the semiconductors composed of intermetallic compounds between numbers of groups II and VI of the periodic table, elements from groups I and V, such as, copper, antimony, arsenic, and phosphorus, are acceptors.

Intrinsic region 2, constituting a large portion of the body of cylindrical crystalline wafer 1, is an essential portion of the device. Intrinsic region 2 may conveniently be formed by the mobile ion diffusion technique described and claimed in my copending application, S.N. 735,411, filed May 15, 1958, now U.S. Patent No. 3,016,313, issued Jan. 9, 1962, and assigned to the present assignee. Briefly stated, in accord with this method, a P–N junction is formed in the body of semiconductor material utilizing a rapidly diffusing, highly mobile activator impurity for the semiconductor as the activator upon one side of the P–N junction. The P–N junction so formed is then biased in the reverse direction so as to impress the electric field of approximately $10^5$ volts per centimeter across the junction. The device is then heated to a temperature sufficient to cause the highly mobile activator ions on one side of the junction to migrate, under the impetus of the electric field, across the junction to cause the formation of a very wide intrinsic region.

Highly mobile ions suitable for this process include lithium in germanium, silicon, or silicon carbide, and the conventional donor and acceptor activator impurities as set forth hereinbefore for high temperature semiconductors, such as, silicon carbide, boron, and the intermetallic compounds of groups III and V of the periodic table and of groups II and VII of the periodic table. Thus, for example, in the formation of the device illustrated in the drawing, a monocrystalline body of silicon having the illustrated cylindrical shape impregnated with approximately $10^{16}$ atoms per cubic centimeter thereof of boron to give it P-type conduction characteristic sand a resistivity of approximately 2.0 ohm centimeters could have N-type regions substantially the size and shape of electrodes 4 and 5 impregnated, by diffusion or alloying, with lithium to form P–N junctions with the adjacent P-type semiconductor material. After the P–N junctions have been formed, both junctions are biased in the reverse direction so as to impress thereupon a field of approximately $10^5$ volts per centimeter, and the entire body is heated to a sufficient temperature to cause the lithium ions to migrate across the already-formed P–N junctions to cause region 2 within the semiconductor body to be transformed into intrinsic conductivity type material. Such a temperature and time may, for example, be 170° for 30 minutes when practiced with a crystal ⅛ inch long and ¹⁄₁₀ inch in diameter having an annular groove therein approximately ¹⁄₆₄ inch deep. The process for the formation of a device such as illustrated in the drawing is described with greater particularity in my aforementioned copending application.

In the operation of the device illustrated in the drawing as a thyratron-like solid-state signal translating device, control electrodes or gates 5 and 8 are each biased in the reverse direction with respect to an associated main electrode 3 or 4. Thus, for example, N-type region 5 is biased positively with respect to P-type region 3 and P-type region 8 is biased positively with respect to N-type region 4. These bias voltages each create an electric field within the respective control electrode apertures 7 and 9. These biases effectively prevent the flow of conduction carriers, either electrons or positive holes between main electrode 4 and main electrode 3 even when electrode 3 has impressed thereupon positive potential with respect to electrode 4, a condition which is ordinarily highly conductive to current flow. Actually, the bias on the P-type gate prevents the flow of electrons, while the bias applied to the N-type gate prevents the flow of "positive-holes." The bias upon N-type control electrode or gate 5 is accomplished by means of a unidirectional voltage source represented by battery 10 and is applied in series with resistance 11 connected between terminals 12 and 13. The bias upon P-type control electrode or gate 8 is accomplished by a unidirectional voltage source represented by battery 14 connected in series with input resistance 15 connected between terminals 16 and 17. An electrical circuit in which device 1 is to operate with a control, switching or rectifying function is connected to electrodes 3 and 4 at terminals 18 and 19, with terminal 18 positive with respect to terminal 19.

It is the function of the devices of the present invention to provide the same circuit characteristics as a thyratron electric discharge device, without the inherent disadvantages thereof, by virtue of their solid-state construction.

In devices constructed in accord with the present invention, the aforementioned characteristic is obtained by the application of a voltage pulse applied between either terminals 12 and 13 or terminals 16 and 17, the pulse being so poled as to oppose the bias applied to the control electrode by respective batteries 10 and 14. When such a pulse is applied to either positive gate 8 or negative gate 5, conduction carriers having the same sign as the conductivity type of the associated main electrode region are injected into the intrinsic region from the associated main electrode. Thus, for example, if the bias upon gate 5 is overcome with a negatively going pulse, positive holes are injected from main electrode 3. If, on the other hand, the bias applied to P-type gate 8 is overcome by a pulse applied between terminals 16 and 17, electrons are injected from main electrode 4. These injected carriers are then attracted to the non-adjacent control or gate electrode having the same sign and passed through the external circuit associated therewith. In so doing, a potential difference is established across the associated resistors, 11 and 15 respectively, which may be sufficient to overcome the controlling bias upon a gate or control electrode. Opposite sign carriers are injected from the associated main electrode to further reduce the bias upon the gate receiving the original signal. The cycle is repeated and the passage of conduction carriers between electrode 4 and electrode 3 increases rapidly. When this occurs, the biases upon, or signals applied to, gates 5 and 8 have no further effect upon the device current provided terminal 19 remains negative with respect to terminal 18. One great advantage of the present invention is that the devices constructed in accord therewith, being responsive to two separate signal sources, exhibit a remarkable versatility.

The unique characteristics of devices constructed in accord with the present invention depend upon the establishment of a large intrinsic region between the two main electrodes 3 and 4, and the maintenance of a positive type gate and a negative type gate having control apertures therein within the intrinsic region. As shown, these gates are located in close juxtaposition to a main electrode having opposite-conductivity type characteristics to the material comprising the gate. While one particular configuration for the establishment of N-type and P-type gates between the main electrodes has been shown, it is obvious that many other geometries may be utilized, as for example, a bar having a square or rectangular cross section may be used. Therefore, it is within the scope of this invention that such other geometries may be found.

While the invention has been disclosed hereinbefore with respect to a particular embodiment thereof, many modifications and changes will readily occur to those skilled in the art. Accordingly, by the appended claims, I intend to cover all such modifications and changes as fall within the true spirit and scope of the invention.

What I claim as new and desire to secure by Letters Patent of the United States is:

1. An asymmetrically conductive device comprising a monocrystalline body of semiconductor having a pair of extrinsic conductivity regions separated by and in contact with an intrinsic conductivity region; a first control member comprising a region of one-conductivity type within said body extending into and constricting said intrinsic region in the vicinity of one of said extrinsic conductivity regions; and a second control member comprising a region of opposite-conductivity type within said body extending into and constricting said intrinsic region in the vicinity of the other of said extrinsic conductivity type regions.

2. An asymmetrically conductive device comprising a monocrystalline body of semiconductor having a P-type region and an N-type region separated by and in contact with an intrinsic conductivity region; a first control member comprising a region of P-type conductivity within said body extending into and constricting said intrinsic region in the vicinity of said N-type conductivity region; and a second control member comprising a region of N-type conductivity within said body extending into and constricting said intrinsic region in the vicinity of said P-type conductivity region.

3. An asymmetrically conductive device comprising a cylindrical monocrystalline body of semiconductor material having a P-type region and an N-type region at opposite ends of said cylindrical body separated by and in contact with a region of intrinsic conductivity type, a first control member comprising an annular region of P-type conductivity material within said body extending into and constricting said intrinsic region in the vicinity of said N-type conductivity region; and a second control member comprising a region of N-type conductivity within said body extending into and constricting said intrinsic region in the vicinity of said P-type conductivity region.

4. An asymmetrically conductive device comprising an elongated monocrystalline body of semiconductor material having a first end region having P-type conductivity characteristics, a second end region having N-type characteristics, and a third region exhibiting intrinsic conductivity characteristics in contact with and separating said end regions; a first control member comprising a region of N-type conductivity characteristics situated along said intrinsic region between said P-type and N-type end regions closely adjacent to said P-type region and extending from the periphery thereof inwardly so as to constrict said intrinsic region at that point sufficiently that a potential applied to said N-type control member is sufficient to control a flow of positive conduction carriers between said end regions; and a second control member of P-type conductivity characteristics situated along said intrinsic region between said P-type and N-type end regions closely adjacent to said N-type end region and extending from the periphery thereof inwardly so as to constrict said intrinsic region at that point sufficiently that a potential applied to said P-type control member is sufficient to control a flow of negative conduction carriers between said end regions.

References Cited in the file of this patent

UNITED STATES PATENTS

| | | |
|---|---|---|
| 2,819,990 | Fuller et al. | Jan. 14, 1958 |
| 2,843,516 | Herlet | July 15, 1958 |